United States Patent

Lucy, Jr. et al.

[11] 3,897,723

[45] Aug. 5, 1975

[54] MEAT EMULSION PROCESSING APPARATUS

[75] Inventors: Ben H. Lucy, Jr., Trussville, Ala.; Robert N. Terrell, La Grange, Ill.

[73] Assignee: The Griffith Laboratories, Inc., Chicago, Ill.

[22] Filed: Dec. 26, 1973

[21] Appl. No.: 428,252

[52] U.S. Cl. ................... 99/467; 99/479; 259/26
[51] Int. Cl. ............................................. A21c 1/00
[58] Field of Search ...... 99/467, 293, 348, 352–353, 99/355, 359, 372, 403, 426–427, 468, 473–474, 477, 479, 483, 485, 487; 259/9–10, 25–26, 109–110

[56] References Cited
UNITED STATES PATENTS

| | | | |
|---|---|---|---|
| 1,609,705 | 12/1926 | Forrest | 99/479 |
| 1,669,962 | 5/1928 | Wihlfahrt | 259/26 |
| 2,576,548 | 11/1951 | Tarpley et al. | 259/25 |
| 2,631,628 | 3/1953 | Mck.Martin | 99/474 |
| 2,768,572 | 10/1956 | Drangle | 99/473 X |
| 3,285,330 | 11/1966 | Root | 259/9 X |
| 3,505,085 | 4/1970 | Straughn et al. | 259/9 X |
| 3,675,902 | 7/1972 | Marshall | 99/348 X |

*Primary Examiner*—Robert L. Bleutge
*Assistant Examiner*—Arthur O. Henderson
*Attorney, Agent, or Firm*—Michael G. Berkman

[57] ABSTRACT

In a processing vessel including mixer apparatus for preparing meat and meat food mixes for the production of comminuted meat and meat food products such as frankfurters, sausages and loaves, steam injection passages formed in a bounding wall of the vessel and terminating in nozzles opening into the interior of the vessel in a zone of agitation of the contents of the vessel, the nozzles delivering pressurized steam directly into the vessel contents to distribute thermal energy rapidly and efficiently throughout the mixture, thereby to thaw any frozen meat, obviate deleterious localized overheating, rapidly reach a selectable predetermined processing temperature, and produce a more stable meat emulsion.

7 Claims, 4 Drawing Figures

MEAT EMULSION PROCESSING APPARATUS

BACKGROUND OF THE INVENTION

The present invention is in the field of comminuted meat food processing to produce frankfurthers, sausages, loaves and similar food items. More particularly, the invention is directed to an improved method and apparatus for producing meat food emulsions of the type finding utility in the commercial preparation of comminuted, emulsion type food products from frozen starting materials.

Extensive prior art deals with various processing procedures for preparing meat emulsions. For the most part, such processes use refrigerated rather than frozen meat as a starting raw material. Since the temperature at which the various mixing operations are carried out in the production of meat emulsions is a critical factor, it will be appreciated that the use of frozen meat products as the starting material or as a constituent of the starting material makes it necessary to provide means for bringing the temperature of the raw material to the required processing range.

One widely used technique has been to store the frozen meat products in a tempering room in which the temperature of the product is permitted slowly to rise. Such storage demands costly space and is objectionable as well in that it is responsible for time delays in the processing procedures. Since the stored meat exudes valuable liquid components during the temperature rise and is also susceptible to bacterial multiplication, the tempering technique does not constitute a satisfactory solution to the problem posed.

Another well established prior art method is to add hot water to the mixer in which the meat, including frozen meat, is blended. However, the total amount of such water which may be added is limited by governmental restrictions relating to the permissible water content of the final product. Often, the addition of the allowed quantity of water is ineffective to raise the temperature of the mixture to that value necessary to produce a stable emulsion. As a result, the final product is of an inferior quality, being soft, having fat caps, exhibiting poor cure color formation, and suffering from emulsion breakdown. It is to the solution of the above indicated problems that the subject invention is directed.

The established scientific principles applicable to the formation of stable emulsions suggest that such emulsions result from the extraction of myosin (skeletal meat protein) and the incorporation of fat particles into the extracted protein matrix to produce an emulsion system in which the fat is present as a discontinuous phase distributed in a continuous aqueous phase containing proteinaceous materials. Comminuted cooked and/or cured meat food products are made from the skeletal and non-skeletal flesh of mammals, fish, shell fish and fowl, hereinafter referred to as meat, usually in combination with other ingredients such as soy protein, cereals or grain, milk or milk solids, etc. In combining the various ingredients, including edible flesh and and non-flesh ingredients, into a stable emulsion, several key factors are involved. Generally, the extraction of myosin from the skeletal meat is accomplished by chopping the meat in a silent cutter or blender in the presence of about 2½–3½ percent salt (sodium chloride). Water or ice may be added to the mixture to provide a concentrated salt solution, such a solution being desirable to achieve maximum extraction of the myosin protein to promote the formation of a stable emulsion. In the specific art involved, a stable emulsion is characterized as one which shows no phase separation, or evidence of jelly pockets, fat caps, or surface grease.

A second important processing variable in the extraction of myosin protein is the temperature of the system. Generally, the protein is extracted most effectively at a temperature range of from about 28° to 32°F. In the usual procedure, the meat components are added in several stages. Emulsion stability is materially affected by the temperature of the meat mix at or during the time when the non-skeletal and/or the fatter skeletal meats are introduced into the slurry containing the extracted myosin. A more stable emulsion results if the fatter meats are introduced at a system temperature of from about 35°–55° F. It will be appreciated that in this somewhat higher temperature range the fats are softer and more liquid than at 32°F.

As a practical matter, in commercial production not all of the optimum conditions for making a stable emulsion are always met. Practical limitations become significant. For example, the present practice is to use increasing quantities of frozen meat in comminuted meat food products. Since such frozen meat contains a lower concentration of extractible myosin protein than does fresh meat, the total amount of extractible protein available is reduced. Moreover, the temperature range which is optimum for the incorporation of the fatter meat components is not reached. A related problem is that the total amount of moisture permitted by law in the final product is limited to 4 times the meat protein concentration plus 10 percent.

The controlling law permits one to add some water (moisture) in order to enhance the extraction of myosin protein and to facilitate the physical blending of ingredients into the comminuted product. When all of the meats in the mixture are fresh, ice may be used to maintain the mix temperature at about 30°F for effective protein extraction. However, when some of the meat in the formulation is frozen meat (temperatures of 28°F or lower), hot water (120°–180°F) is used. The temperature of the hot water is ordinarily held below 180°F in order to obviate objectionable cooking effects and protein denaturization. Such denaturization of the myosin protein renders the protein "non-functional", that is, incapable of "binding", resulting in an unstable emulsion producing products which contain fat caps, jelly pockets, or which are soft and mushy. Thus, with the use of increasing proportions of frozen meats in the emulsion formulation, the sausage maker faces two critical problems. The first is that the amount of hot water he may add is restricted to meet the requirement that moisture in the final product shall not exceed 4 times the meat protein plus 10 percent. The amount which he may add is often insufficient to raise the temperature of the meat mix to the required range for proper emulsification of the fat particles. The second difficulty is that if the water added is too hot, the protein is rendered non-functional. The significance of these limitations is evident from the following examples typical of the prior art manufacturing procedures.

EXAMPLE I

A finished product characterized in containing minimum protein (11%), maximum fat (30%), and total moisture within the limit of 4 times P (protein) plus 10 percent (54%) was produced using the formulation:

| | |
|---|---|
| 100 pounds | meat mix (skeletal & non-skeletal) |
| 3 pounds | salt (sodium chloride) |
| 4 pounds | seasoning (cure etc.(non-meat ingredients)) |
| 22 pounds | added water, (ice, cold or hot water) |
| 129 pounds | total uncooked weight |
| 116 pounds | yield obtained (cooked weight at 10% shrinkage) |

Based upon the original premise and limitations, the various parameters of the meat mix calculate as follows:

34.8 pounds fat÷116=30% fat yielded
12.76 pounds protein÷116=11% protein yielded
40.6 pounds moisture÷116=35% moisture from meat mix
22.0 pounds water÷116=19% yielded moisture from added water The total "yielded" moisture concentration is derived 35 percent from the meat mix plus 19 percent from the actual water addition, totaling 54 percent in the finished yielded product. This amount of water complies with the formula: 4×P+10%. (4×11=44, plus 10%=54% moisture). The 19% of moisture was added to the finished product in the form of ice or water.

The total moisture which may be added as ice or water will vary with the moisture concentration in the meat used. In Example 1, the total moisture in the product was 62.6 pounds, 65 percent of which (40.6 pounds) came from the meat itself and 35 percent of which (22 pounds) was added as water. It will be understood that as the percentage of moisture in the meat increases, the amount of water added decreases. It is not uncommon to find industrial formulations, utilizing frozen skeletal and non-skeletal meats (high in natural moisture content), where only 8 to 15 pounds of water are added to 100 pounds of meat instead of the 22 pounds shown in Example 1.

When the 100 pounds of meat is fresh meat (temperature of 32°-38°F) cold water or ice is used and, during the incorporation of the fat particles, friction heating produced by the chopper blades results in a final mix temperature of 50°-55°F, giving a stable emulsion. However, when greater proportions of frozen meats are used in the formulation, the 22 pounds or less of hot water (120°-180°F) of Example I is insufficient to raise the mix temperature to the range of 32°-55°F and preferably 42°-52°F for stable emulsion development. Under such conditions, the industry has become resigned to accepting lower product quality as well as some processing failures. The products are often soft, mushy, and have fat caps and jelly pockets indicating emulsion breakdown or phase separation. Additionally, such products exhibit pure cured meat color development, lacking the desirable pink hue. The deficiencies indicated above are even more apparent in continuous, more rapid production systems in which the product is cooked in from 34-50 minutes as contrasted with conventional cooking times of 1½ to 2 hours. Surface skin formation, which is essential to proper peeling and packaging operations, is insufficient in continuous systems which use significant quantities of frozen meats in their operation.

Additional examples, as set forth and discussed below, are provided further to illustrate the problems which are encountered in the prior art use of increasing quantities of frozen meats.

EXAMPLE II

ALL MEAT FRANKFURTER FORMULATION

| | |
|---|---|
| 22.4 pounds | fresh cow beef (32°F) |
| 26.6 pounds | frozen pork trim (21°F) |
| 18.8 pounds | frozen picnics (18.0°F) |
| 24.0 pounds | frozen beef trim (20°F) |
| 9.2 pounds | cooked rework (34°F) |
| 100.0 pounds | Total |

To the above 100 pound total, 19.5 pounds of 120°-160°F water was added. With 69.4 percent of the total meats in the frozen state the final blend temperature reached only 32°F. The resulting finished product was unstable, with fat caps and emulsion breakdown.

EXAMPLE III

3½% frankfurter formulation

| | |
|---|---|
| 20.1 pounds | fresh cow beef (32°F) |
| 18.8 pounds | frozen picnics (18.0°F) |
| 19.5 pounds | frozen beef trim (24°F) |
| 14.3 pounds | frozen beef tripe (16°F) non-skeletal |
| 14.3 pounds | frozen beef hearts (18°F) non-skeletal |
| 3.9 pounds | frozen beef tissue (20°F) non-skeletal |
| 9.1 pounds | cooked rework (34°F) |
| 100.0 pounds | |

To the 100-pound meat mix indicated above, 3.9 pounds of soy protein concentrate and 8.7 pounds of hot water (170°F) were added. Because of the high moisture content in the non-skeletal meats (tripe, hearts, tissue) it was permissible to add moisture of only 8.7 pounds. As a result, the temperature of the final blend reached only 34°F and a soft, mushy product with unmistakable evidence of emulsion breakdown (instability) resulted.

EXAMPLE IV

ALL BEEF FRANKFURTER FORMULATION

| | |
|---|---|
| 36.4 pounds | fresh cow beef (36°F) |
| 54.5 pounds | frozen beef trim (22°F) |
| 9.1 pounds | cooked rework (34°F) |
| 100.0 pounds | Total |

To the 100 pounds of meat mix of Example IV 19.5 pounds of hot (140°-170°F) water was added. Because of the lower percentage of frozen meat in this formulation, and the additional added hot water, the final blend temperature was 43°F. However, because beef fat is hard as contrasted with the pork fat contained in Examples II and III, the all beef product of Example IV again showed fat caps and emulsion breakdown.

Various techniques have evolved in the meat industry for using frozen meats both in fine and course comminuted meat food mixes. The freezing temperature of edible flesh from mannals, fish, shell fish and fowl is in the range of 26°-29°F. For optimum storage stability, the meats are blast frozen in high velocity air and cooled to 0° to 10°F. These frozen products are received at the sausage plant in 40, 60 and 80-pound boxes. Thereafter, the sausage maker may follow any of several alternative procedures, as outlined and discussed below.

EXAMPLE V

Conventional Methods of Preparing Frozen Meats for Use in Fine and/or Course Comminuted Meat Food Products.

In Example V, alternative A, the conventional prior art tempering of boxed frozen meat, is extremely time consuming. Moreover, as the product thaws, there is excessive loss of fluids, resulting in more rapid bacterial growth and accelerated spoilage. That is, the outer surface portions of the packaged products thaw first and remain in a temperature range of 40°–60°F, which permits rapid bacterial growth. Moreover, the procedure is objectionable from the standpoint of storage space demands and time involved.

The procedure indicated in option B of Example V represents a more recent technique. However, appreciable space is required for the tunnel used, and microwave energy is costly.

In alternative C of Example V the frozen block of meat is first broken in a breaker plate machine and then transported through a hot air tunnel. While this procedure is less costly than alternative A or B, it requires time and space, as well as a significant capital investment for gas or electric heating equipment.

The procedure indicated as alternative D in Example V is the least expensive and most direct conventional method currently in use in the industry. While the method is excellent from an economic standpoint, it is often unacceptable functionally. That is, it fails to produce stable emulsions. As the concentration of frozen meats incorporated in the formula is increased, the temperature and moisture restrictions outlined in Examples I–IV become more significant.

An additional important parameter in the processing of frozen meats is the sequence in which the materials are added to the blender or chopper. This sequence will vary, depending upon the temperature which must be achieved within the time period available, in order to obtain maximum production efficiency. For example, total blending or chopping time may range from about 4 to about 15 minutes, being a function of the weight or the quantity of meat mix (1000 or 5000 pounds) and the temperature sought for the final blend or chop.

In Example II above (all meat frankfurter formulation) the frozen meats were added first, together with salt, cure, seasoning and hot water. The purpose of this procedure was to raise the temperature as rapidly as possible before introducing the fatter meat components. In Example III (3½ percent frankfurter formulation), the fresh cow beef was added first together with salt, cure, seasoning and 10 percent of the total water to be added. A concentrated solution was achieved, promoting the extraction of myosin protein. Since this formulation contains 32.5 percent of non-skeletal non-binding meats, the extraction of myosin takes place primarily before the fatter meats are added. In the case of Example IV (all beef frankfurter formulation) the frozen beef was again added to the blender first, together with salt, cure, seasoning and hot water to raise the temperature as rapidly as possible. Under the conditions described, the myosin protein was not completely extracted from the fresh cow beef and the 19.5 pounds of hot water was inadequate to raise the blend temperature to the 50°–54°F temperature necessary for proper emulsification of the beef fat to produce a stable emulsion.

The present invention constitutes a simple yet highly effective solution to the problem of achieving the required temperature while staying within the permissible limits of water concentration.

SUMMARY OF THE INVENTION

The present invention provides an improved apparatus and technique whereby the mixing or blending of meat products is carried out simultaneously with the elevation in temperature through the controlled introduction of live steam injected directly into the agitated meat mass. It is an important feature of the invention that one achieves improved and more stable emulsion systems. Additionally, the product produced exhibits improved binding characteristics, skin formation, and final color factor. An additional important consideration is that the process of the invention is more economical than the practices of the prior art.

An important discovery of the invention is that it is feasible to introduce pressurized steam directly into a mixing meat system without causing localized overheating such as would result in a "cooking" of the meat or a denaturization of the meat proteins.

It is an important feature of the present invention that there is provided an improved technique for effectively and rapidly introducing thermal energy into a meat emulsion forming system.

A related feature of the invention is that it provides a method whereby the quantity of thermal energy introduced into a meat processing system for a given quantity of moisture added is materially and significantly increased.

It is a feature of the invention that it provides a most effective process for rapidly and uniformly heating a meat emulsion system to ensure the establishment of a stable emulsion while restricting the quantity of water added to well within allowed limits.

Still another feature of the inventive process is that it may be carried out with minimum modification of the blending equipment currently used in producing meat emulsions.

Another important advantage of the invention is that it makes possible the utilization of frozen meat directly in the meat emulsion kettle without any need for costly pre-tempering or thawing.

The improved process of the invention produces highly stable meat emulsions resulting in final products free from fat caps and jelly pockets and which exhibit good bind and surface skin formation, and have excellent cure colors and taste.

Other objects, advantages, and features of the invention will be apparent from the following detailed description considered in conjunction with the accompanying drawings.

DETAILED DESCRIPTION OF A PREFERRED INVENTIVE EMBODIMENT

In effectuating and achieving the aims and purposes of the present invention, there is provided, in combination with a processing vessel which includes an agitator, means for injecting live steam into the mixing contents of the vessel.

Figures 1, 2, 3:
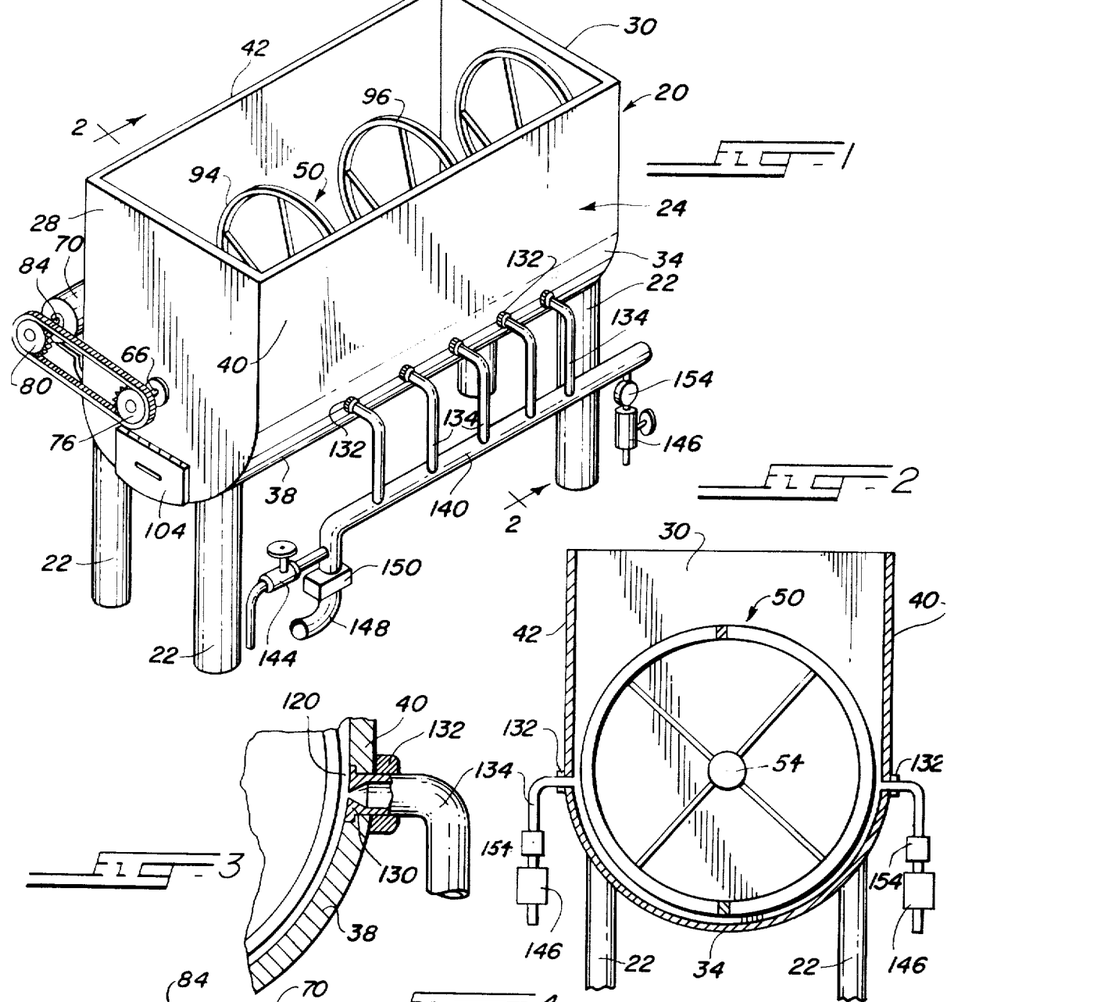
FIG. 1 is a perspective view of one embodiment of the processing vessel used in the practice of the invention.
FIG. 2 is a vertical cross sectional view taken on the line 2—2 of FIG. 1.
FIG. 3 is an enlarged fragmentary cross sectional view showing a steam input jet secured in the wall of the processing vessel.
Figure 1:
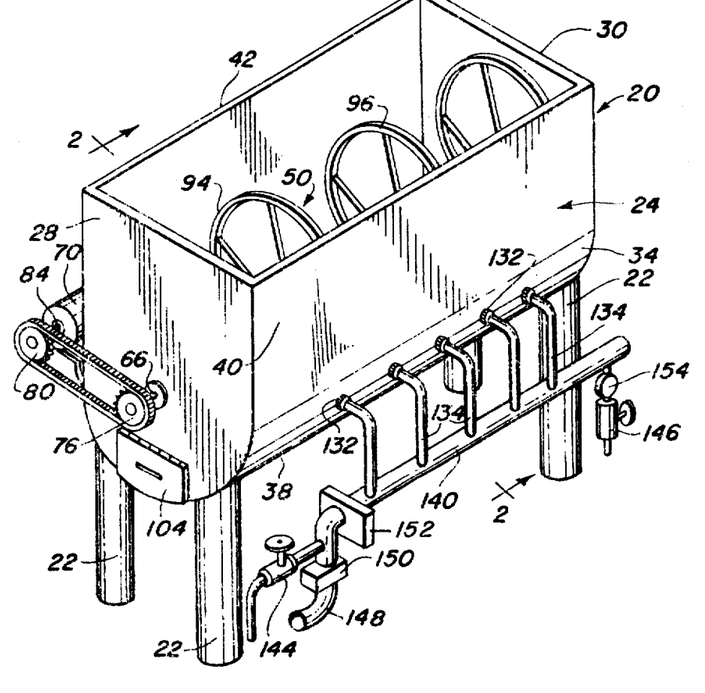
Figure 4:
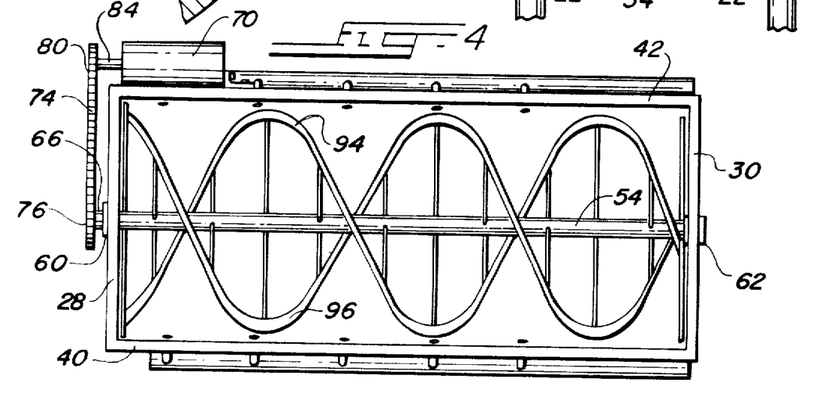
FIG. 4 is a top plan view of the processing vessel of FIG. 1.

Referring now to the drawings, and particularly to FIG. 1 for the purpose of illustrative disclosure, the apparatus of the invention is shown as a processing vessel 20 carried on a supporting cradle or frame including legs 22. In the specific embodiment of the invention depicted, the processing vessel 20 is of stainless steel construction and consists of an elongated tank 24 having a pair of vertically extending end walls 28 and 30 connected by a trough-like rounded cylindrical section 34. The rounded bottom 38 of the tank is formed integrally with upwardly extending extensions defining side walls 40 and 42, the vessel being essentially U-shaped in transverse sections, as seen in FIG. 2.

A stirrer or mixer 50 extending longitudinally within the vessel 20 is rotatably supported on the end walls 28 and 30 thereof. In the specific form of the invention shown an axially extending central shaft 54 of the stirrer revolves in low friction bushings 60 and 62. One end 66 of the shaft 56 extending beyond the vessel 20 is coupled to a drive motor 70 through a chain 74 and sprockets 76 and 80 carried respectively on the stirrer shaft 66 and the drive shaft 84 of the motor 70. As shown, the stirring member is a double ribbon mixer which includes a pair of curved blade elements 94 and 96 the outer vessel-sweeping edges of which are spaced so as to wipe in substantially contiguous contact the inner wall surfaces of the rounded portion 38 of the processing vessel 20, all in accordance with techniques well known in the relevant art. One end wall 28 of the processing vessel is formed with a product discharge opening covered by a hingedly secured cover plate 104.

The novel features of the invention, which include the mechanical means and the technique by which the vessel is heated are described with reference to FIGS. 1, 2 and 3. As shown, at longitudinally spaced positions extending along the length thereof, the basin-like trough 34 is provided with a series of spaced openings or through passages 120. These openings are located on the curved portion 38 of the tank 24 so that the mixer blades 94 and 96 sweep or wipe across the openings in very close proximity thereto during the rotation of the ribbon mixer 50. A steam jet fitting or nozzle 130 secured in place by a locking flange 132 extends through each hole 120 and is sealed in fluid-tight engagement with the vessel wall in the curved section 38 just below the flat side wall portions 40 and 42. A steam conducting line 134 connects the nozzle 130 with a steam supply manifold 140 the latter having bleed-off valves 144 and 146 at the points of steam entry and discharge. The steam input end 148 of the manifold 140 is provided with a liquid separator 150, a steam flow regulator valve 152, and the far end with an impulse trap 154.

In a specific installation utilizing a 1000-pound capacity stainless steel double ribbon blender five ⅜ inch stainless steel tubing jets were inserted on 12-inch centers about 22 inches below the top of the blender and in the curvature of the shell, a bank of such jets feeding each side of the vessel. The shell ports 120 were slightly below the height of the blender shaft 54. Each ⅜ tubing jet was connected to a ¾ inch stainless steel manifold. The double ribbon blender was operable in the range of from about 10 to about 40 rpm, 28 rpm being the preferred speed.

The process steps of the invention using the equipment described above are set forth more definitively in the paragraphs below. Frozen meat, used as the starting material, is broken and flaked and then ground to obtain the desired particle size. In some situations the grinding operation may be omitted. The comminuted meat is then agitated in the blender with the simultaneous injection of steam, this being the critical step of the method of the invention. The technique described permits one to use 100% frozen meat as the starting raw material and yet produce a stable emulsion which contains no more than the permissible concentration of moisture. The results obtained in the following experiments indicate the effects of varying the program for the steam introduction and establish the conditions for obtaining optimum results.

Three trial runs, each utilizing the same meat food formulations, were carried out using the apparatus of the invention. In each case, the meat components were added in the following order.

| | | |
|---|---|---|
| First | 225 pounds | Deboned Frozen Chicken (20°F) |
| Second | 109 pounds | (125°-150°F) Water |
| Third | 15 pounds | Sodium Chloride Salt and 29 lbs. dry ingredients* |
| Fourth | 225 pounds | Deboned Frozen Chicken (18°F) |
| Fifth | 185 pounds | Frozen Beef Trim (18°F) |
| Sixth | 125 pounds | Frozen Pork By-products (26°F) |

*Dry ingredients include (1) sugars, (2) flavorings and/or seasonings, (3) cures and/or cure accelerators, and (4) fillers, binders and extenders (starches and/or proteinaceous materials)

Note: In trials 2 and 3, only 92 pounds of water was added. The steam condensed into the product was calculated to replace 18 lbs. of water, maintaining a total water addition of 109 lbs., as indicated.

Table I summarizes the steps for each of the three trials carried out and indicates the ratings given the product by a trained taste panel.

permit the myosin protein to entrap the more liquid fats, producing a more stable matrix emulsion. The product evaluation and taste panel adjudged the product of Trial 3 to be decidedly better and definitely more acceptable than either of the products of Trials 1 and 2, as evidenced by a cook loss of only 0.79 percent and the absence of fat caps and emulsion breakdown.

Chemical analyses were carried out on the products of the three runs, utilizing standard methods of analysis. The results are set forth in Table II below and discussed in the following paragraph.

TABLE II

| | Trial 1 | Trial 2 | Trial 3 |
|---|---|---|---|
| Moisture | 55.3 | 55.2 | 57.4 |
| Protein | 12.10 | 12.28 | 11.99 |
| Fat | 27.7 | 27.51 | 26.10 |
| Added Moisture (4 × P + 10%) | 6.9 | 6.13 | 9.48 |

In Trials 2 and 3 in which live steam was injected into the agitated mixture, there was no discernible cooking

TABLE I

| | Trial 1 | Trial 2 | Trial 3 |
|---|---|---|---|
| Step No. 1 | Meat broken or flaked | agitation or blending begun | |
| Step No. 2 | Chopping of meat (optional) | | |
| Step No. 3 | — | Steam valve open ¼ – 3 min. to 24°F | 4 min. - No steam Temp. 24°F |
| Step No. 4 | — | Steam valve open ¼ – 4 min. to 26°F | Steam valve open ¼ – 4 min. to 28°F |
| Step No. 5 | — | Steam Valve open ¼ – 4 min. to 32°F | 6 min. Full open steam to final blend temp. of 54°F |
| Step No. 6 | — | Full Open Steam 2 min. to Final Temp. of 45°F | |
| Final Blend Time | 16 min. | 13 min. | 14 min. |
| Final Blend Temp. | 34°F | 45°F | 54°F |
| Consumer Cook* Test | 3.2% | 2.5% | 0.72% |
| Taste Panel** Results | Soft, mushy. Poor skin formation and cure color. Fat caps | Better than 1. Slightly soft. Slight fat caps & breakdown | Best Product More firm than 1 or 2 and had no fat caps or breakdown. Best pink color |

* Consumer Cook Test: Five franks are placed in boiling water for one minute, then removed from stove, allowed to cool to 140°F and reweighed. Weight loss is a measure of emulsion stability. A stable emulsion will have 1% or less loss, or a gain of ½%.

** Panel consisted of four trained laboratory men who do flavor and meat product taste evaluations daily.

In Trial 1 of Table I no steam was added during the blending process. The temperature of the final product after 16 minutes was only 34°F. This product was an unstable emulsion as evidenced by a cooking loss of 3.2 percent and by the comments of the taste panel.

In Trial 2 steam was added slowly during the first 11 minutes of blending with full steam applied for the last 2 minutes of the blending period. The temperature of the blend rose from an initial 24°F to a final value of 45°F in 13 minutes. It was noted, in comparing Trials 1 and 2, that a reduction in the blending time (3 minutes) and an increase in the final blend temperature (11°F) produced a more stable product.

The best emulsion system (most stable product) and the most acceptable product from other viewpoints was produced in Trial 3 in which a final blend temperature of 54°F was reached. Accordingly, during steps 5 and 6, at which time the fatter meat components were added, the mix temperature was sufficiently high to of the meat protein so as to render it "non-functional". In each case the rate of steam injection into the blender and the rotational speed of the agitator were such that there was rapid and substantially uniform dissipation of steam throughout the product. This rapid heat dissipation obviated protein degradation. As the blend temperature increased from 24°F to 54°F, the mixture assumed a "creamy" appearance indicating that good protein extraction and fat emulsification were taking place, to produce a more stable emulsion.

In accordance with the method of the invention it has been discovered that the sequence in which the various components of the mix are incorporated is very important in ensuring that the final blend will be uniform in composition and will have a minimum temperature gradient throughout its mass. The effect of varying the order of ingredient addition or changing the time at which particular ingredients are incorporated in the mix is shown in Examples A and B below:

EXAMPLE A

| Ingredients in Order of Addition | Fat Caps | Finished Product Evaluation | | | Added Water |
|---|---|---|---|---|---|
| | | Cook Loss | Chemical Moisture | Protein | |
| 1st. 400 lbs. Frozen meat (0°F) | Slight | −0.8% | 55.2 | 12.4 | +5.6% |
| 2nd 18 lbs. Water, 15 lbs. Salt | | | | | |
| 3rd. 225 lbs. Beef (37°F) and 125 lbs. Pork (22°F) | | | | | |
| 4th 29 lbs. dry ingredients | | | | | |

The 400 lbs. of frozen meat, 18 lbs. of water and 15 lbs. of salt were added to the blender apparatus of the invention and brought to a temperature of 28°–30°F by the introduction of steam supplied at a pressure in the range of 38–40 psi. The 225 lbs. of beef at 37°F and 125 lbs. of frozen pork at 22°F were incorporated into the mixture, and then 29 lbs. of dry ingredients constituting flavorings, seasonings and cure were added. It was observed that at this stage of the process that the mix tended to ball up and refreeze around the shaft of the blender. The ribbons of the apparatus were incapable of breaking up the frozen product and the mixture lacked the desired degree of homogeneity. Moreover, temperature measurements carried out throughout the mass indicated a 25-degree temperature spread in the mass as determined by probing outer and inner core portions of the meat mix from end to end of the vessel.

EXAMPLE B

| Ingredients in Order of Addition | Fat Caps | Finished Product Evaluation | | | Added Water |
|---|---|---|---|---|---|
| | | Cook Loss | Chemical Moisture | Protein | |
| 1st. 400 lbs. Frozen meat(0°F) | Slightly Better - Ex. A | +1.5% | 54.3 | 12.3 | +5.1% |
| 2nd. 18 lbs. Water,15 lbs.salt, 29 lbs. Dry ingredients | | | | | |
| 3rd. 225 lbs. Beef. (37°F) 125 lbs. Pork (22°F) | | | | | |

A product which was markedly superior to that obtained in Example A was produced by changing the time when the "dry ingredients" were added to the mix. As in the case of Example A, the 400 lbs. of frozen meat and the 18 lbs. of water add 15 lbs. of salt were added and the temperature of the mixture brought to 28°–30°F by the introduction of steam at a pressure of 38–40 psi. As the next step, and prior to adding additional meat, the dry ingredients were added. Blending was continued and 225 lbs. of beef at 37°F and 125 lbs. of frozen pork at 22°F were incorporated into the mixing vessel. It was observed that no balling up took place around the shaft but that the material tended to inter leaf and fold into the ribbons, thereby producing a more homogeneous product and more uniform temperatures throughout the mass. In fact, measurements made in zones throughout the mixture showed a temperature spread of only about 10°F, much less than had been experienced for the procedure of Example A.

The procedure used in Example B produced a more stable product than the Example A product as evidenced by less fat caps (emulsion breakdown), a cook gain instead of a loss as in Example A. The added moisture was comparable. The amount of condensed steam was calculated with the 18 lbs. of water added to yield a finished product of between 5 and 6 percent permissible added moisture.

In each of the above Examples A and B, the total blending time was between 12 and 14 minutes and the total time during which steam was added was in the range of 10–12 minutes, no steam being introduced during the last 2 minutes of mixing. In each case the 29 lbs. of "dry ingredients" consisted of the following ingredients:

TABLE III

STEAM FLOW RATE - VERSUS TIME AND CONDENSATION EFFICIENCY RATIO (95%) INTO PRODUCT

| FLOW RATE | | TIME | | | | | | | |
|---|---|---|---|---|---|---|---|---|---|
| lbs. Steam/Hr. | Lbs. Steam/Min. | 1 Min. | 3 Min. | 5 Min. | 7 Min. | 9 Min. | 11 Min. | 13 Min. | 15 Min. |
| 1,400 | 23.3 | 22.1 | 66.3 | 110.5 | 154.7 | 198.9 | 243.1 | 287.3 | 331.5 |
| 1,200 | 20.0 | 19.0 | 57.0 | 95.0 | 133.0 | 171.0 | 209.0 | 247.0 | 285.0 |
| 1,000 | 16.7 | 15.9 | 47.7 | 79.5 | 111.3 | 143.1 | 174.9 | 206.7 | 238.5 |
| 800 | 13.3 | 12.6 | 37.8 | 63.0 | 88.2 | 113.4 | 138.6 | 163.8 | 189.0 |
| 600 | 10.0 | 9.5 | 28.5 | 47.5 | 66.5 | 85.5 | 104.5 | 123.5 | 142.5 |
| 400 | 6.7 | 6.4 | 19.2 | 32.0 | 44.8 | 57.6 | 70.4 | 83.2 | 96.0 |
| 200 | 3.3 | 3.1 | 9.6 | 15.5 | 21.7 | 27.9 | 34.1 | 46.5 | 46.5 |
| 100 | 1.7 | 1.6 | 4.8 | 8.0 | 11.2 | 15.3 | 17.6 | 20.8 | 24.0 |

8 lbs. corn syrup solids  
6–8 lbs. dextrose } carbohydrates  
8 lbs. ground mustard  
spice formulation } Flavorings and/or seasoning  
cure (nitrite, nitrate, and cure accelerators)

That is, the dry ingredients consisted, in each case of sugars, flavorings or seasonings, cures and cure accelerators fillers, binders, and extenders (starches and proteinaceous materials).

Through simple calculations of steam flow rate and time measurement the actual amount of moisture condensed into the product may be determined and controlled. A table of values indicating the time relationship relating to flow rate and pounds of steam introduced into the product is set forth in Table III.

While the present invention has been described with reference to a single preferred embodiment, the concept of the invention embraces broadly the use of live steam injected directly into a meat processing kettle for producing improved meat emulsions. The process is particularly applicable to and especially adapted for the handling of systems using high percentages of frozen meats. The results obtained establish important advantages for the invention, including but not limited to the following:

a. As indicated by raising the temperature of a 1000 pound mix from 24°F to 54°F in only 13 minutes, the method of the present invention reduces significantly the time required for bringing a mix from a sub-freezing temperature to a temperature conducive to the formation of stable emulsions.

b. The process of the invention increases the handling capacity of a given piece of processing equipment. That is, as the frozen meat thaws during the steam introduction, the meat occupies a lesser volume in the blender and, accordingly, a greater quantity of raw material can be handled in apparatus of a given volume.

c. The flexibility in flow rates and in time permits operators to control the process so that optimum temperatures exist at each stage, thereby to establish more stable meat emulsions.

d. With the more efficient and more rapid elevation of blend temperature and with the associated density increase in the product, a more homogeneous, uniform and reproducible product composition results.

e. The method of the invention effects fuel conservation particularly in the handling of frozen meat raw materials. For example, if the temperature of the meat product at the completion of the blending operation is 55°F, the product may be stuffed at about 60°–65°F. At these relatively elevated temperatures lower pressures suffice to carry out the stuffing operation since the product is more fluid. Moreover, the higher starting temperature effects significant heat savings in the final cooking step.

While the present invention has been described with reference to a specific type of blender which, in its preferred form constitutes an elongated trough, it is contemplated that the invention will be useful with and have applicability in other types of blenders and mixers as well. For example, the invention may be practiced in conjunction with a mixer or blender known as a "silent cutter". This apparatus includes a cutting blade array suspended to extend into a round vessel, the vessel itself being rotatable about a vertical axis to effect a cutting of and mixing of the vessel contents. In the light of the present disclosure, those skilled in the art will be able to adapt the above-described vessel for the practice of the present invention. That is the vessel wall can be modified to include a series of spaced steam inlets each communicating with a steam supply tube or pipe, the pipes being interconnected through a rotatable steam-conducting joint.

It is to be understood that the forms of the invention, herewith shown and described, are to be taken as preferred examples of the same, and that it will occur to those skilled in the art that variations, changes and modifications may be resorted to without departing from the spirit of the invention, or the scope of the subjoined claims.

What is claimed is:

1. In a processing vessel for the preparation of meat mixtures and meat food mixtures of the type used in the manufacture of comminuted meat food products such as fine and course emulsified products as well as sectioned and formed meat and meat food products, said emulsions containing proteinaceous materials and fat components, said vessel including blending means supported in said vessel for agitating and mixing vessel-contained material including meat product components to provide a homogeneous blend thereof, the improvement comprising a plurality of spaced fluid inlet means including through passages communicating between the exterior and the interior of said vessel, said passages terminating in steam outlet means opening into said vessel for discharge of pressurized steam directly into said blend at a region of agitated movement of material contained in said vessel below a processing level of material contained in said vessel for efficiently and rapidly elevating the temperature of said material while precluding deleterious localized excessive heating thereof, thereby to form a stable meat emulsion.

2. The improvement as set forth in claim 1 wherein said vessel is generally trough-like in contour and includes opposed vertical end walls and a product retaining wall extending therebetween, said blender means being rotatably supported longitudinally in said vessel between said end walls and including a blade means disposed to sweep through an annular course interiorly of said vessel, and wherein said region of blender agitated movement of material includes a arcuate zone adjacent to said product retaining wall of said vessel along the length thereof thereby to effect a continuous and rapid removal and transport of material from said wall and from said arcuate zone for prompt dispersion and distribution of said material throughout said vessel, and wherein said through passages penetrate said wall and said steam outlet means constitute a longitudinally extending array of pressurized steam discharge ports disposed along said wall and communicating with the interior of said vessel at a level thereof below a processing level of material contained in said vessel;

whereby pressurized steam delivered to said through passages and forcibly discharged into said vessel from said steam outlet means enters directly into the material contained in said vessel in said arcuate zone, said zone being characterized in that blender-impelled removal and dispersion of material therefrom is prompt and rapid thereby to obviate local overheating of the contents of said vessel.

3. In a processing apparatus for the preparation of meat mixture emulsions of the type used in the manufacture of meat mixtures and meat food mixtures of the type used in the manufacture of comminuted meat food products such as fine and course emulsified products as well as sectioned and formed meat and meat food products, and including a generally trough-like vessel having opposed vertical end walls and a product retaining wall extending therebetween, blender means coextensive with said wall and rotatably supported longitudinally in said vessel, said blender means constituting agitating means for mixing meat components contained in said vessel, said blender means including blade means disposed to execute an annular course interiorly of said vessel through an arcuate zone adjacent to said product retaining wall along the length thereof to effect a continuous and rapid removal and transport of material from said wall and from said zone for prompt dispersion and distribution of said material throughout said vessel, the improvement comprising;

a plurality of fluid inlet means spaced longitudinally along said vessel and extending through said wall, said fluid inlet means constituting an array of through passages disposed in said wall and terminating in steam outlets communicating with the interior of said vessel at a level thereof below a processing level of material contained in said vessel, said fluid inlet means adapted for connection of steam conveying lines thereto, whereby pressurized steam delivered to said fluid inlet means and forcibly discharged from said outlets enters directly into the material contained in said vessel in said arcuate zone, and whereby said material heated by the steam is then promptly and rapidly removed for dispersion throughout said vessel to obviate objectionable local overheating of the material during elevation of the temperature of the contents of the vessel to enhance and accelerate the formation of a stable meat emulsion.

4. In a meat product processing vessel adapted for the preparation of meat mixtures and meat food mixtures of the type used in the manufacture of comminuted meat food products such as fine and coarse emulsified products as well as sectioned and formed meat and meat food products, said emulsions containing proteinaceous and fat components, the combination with horizontally extending blender means supported in said vessel for mixing and distributing vessel-contained material throughout said vessel to provide a homogeneous blend, of steam injection means comprising a plurality of fluid inlet means including through passages communicating between the exterior and the interior of said vessel, said through passages terminating in steam outlets within said vessel for delivery of pressurized steam directly into said blend in a region of agitated movement of material to elevate the temperature of said material while precluding deleterious excessive localized heating thereof, thereby to provide a stable meat emulsion.

5. The combination as set forth in claim 4 wherein said blender means includes ribbon means disposed to sweep through an annular course interiorly of said vessel and wherein said region of agitated movement includes an arcuate zone adjacent to a product retaining wall of said vessel, said through passages extending through said wall with said steam outlets communicating directly with said arcuate zone of agitated movement of the material contained in said vessel.

6. The combination as set forth in claim 4 wherein said vessel is of a trough-like configuration having a pair of opposed vertical end walls and a product retaining wall interconnecting said end walls and extending therebetween, and means supporting said blender means between said end walls for rotation about a horizontal axis extending normally to said end walls, and wherein said steam outlets constitute an array of steam discharge ports disposed in said wall of said vessel longitudinally therealong for injection of pressurized steam into said vessel below a processing level of material contained therein.

7. The apparatus as set forth in claim 4 and further comprising steam flow regulating means for controlling the rate of steam discharge from said outlets into said vessel.

* * * * *

UNITED STATES PATENT OFFICE
CERTIFICATE OF CORRECTION

Patent No. 3,897,723          Dated August 5, 1975

Inventor(s) Ben H. Lucy, Jr., et al.

It is certified that error appears in the above-identified patent and that said Letters Patent are hereby corrected as shown below:

Figure 1 of the drawing should appear as shown below:

Signed and Sealed this thirteenth Day of January 1976

[SEAL]

Attest:

RUTH C. MASON
Attesting Officer

C. MARSHALL DANN
Commissioner of Patents and Trademarks